FILTER CONTROL CIRCUIT
Filed April 30, 1959
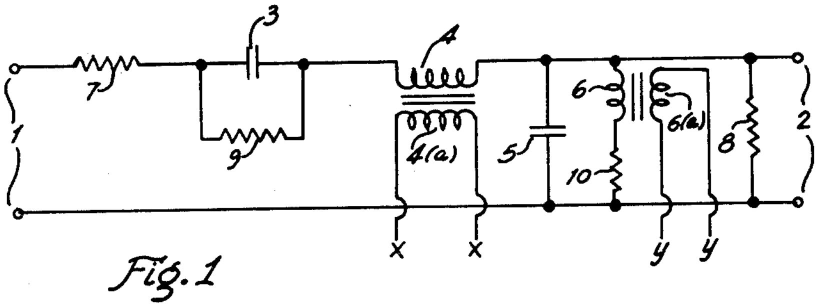
Fig. 1
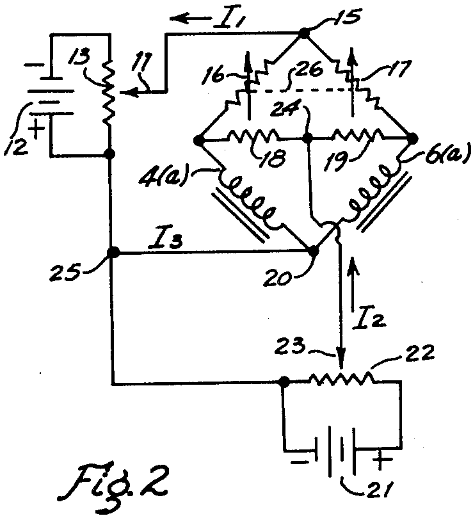
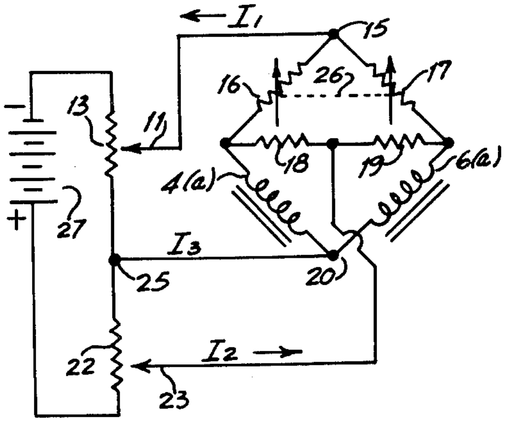
Fig. 3
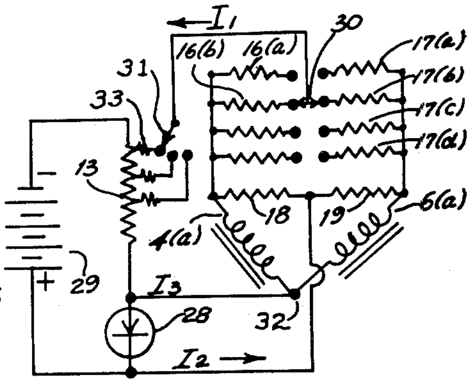
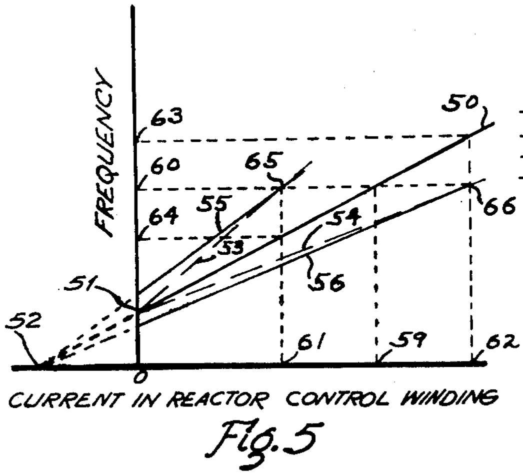
Fig. 4
Fig. 5
INVENTOR.
NORMAN C. PFLAUM
BY: [signature]

2,984,801

FILTER CONTROL CIRCUIT

Norman C. Pflaum, Oakmont, Pa., assignor to Gulf Research & Development Company, Pittsburgh, Pa., a corporation of Delaware Filed Apr. 30, 1959, Ser. No. 809,958

5 Claims. (Cl. 333—70)

This invention relates to a control circuit for an electrical filter network employing saturable-core reactors, and in particular relates to such a control circuit that is advantageous for use in seismograph filters of the band-pass type.

In the seismograph prospecting art it is conventional to use amplifying equipment which amplifies electrical signals obtained from the geophone so as to operate recording equipment such as oscillographs and the like. In order to provide an improved signal-to-noise ratio it is now common practice to include in each amplifier channel an electrical filter, usually one having a band-pass type of frequency characteristic. Inasmuch as the predominant frequencies of seismic reflections vary from place to place the band-pass filters are usually of an adjustable type so that the upper and lower cut-off frequencies of the filter may be varied to suit local conditions. A convenient form of frequency adjustment often employed is one which allows the midfrequency to be adjusted and which allows the band width also to be adjusted, preferably by means of independent controls.

When seismograph filters first came into use adjustment of the filter characteristic was generally accomplished by switching of components, for example, by changing the capacitance in the filter circuit. More recently saturable-core reactors have been employed in seismograph filter circuits, in which case the filter characteristic is more conveniently adjusted by control of the inductance of the reactor by varying its saturating current. An example of the latter type of seismograph filter system is shown in U.S. Patents 2,330,216 and 2,867,779.

It has been desirable to be able to independently adjust the midfrequency and the band width of a seismograph filter of the type shown in U.S. Patent 2,867,779. This has been accomplished by connecting the control coils of the respective saturable core reactors employed into a network which serves to separate the respective control currents for these respective adjustments. An example of such a circuit is shown in Bardeen application Serial No. 546,708 filed November 14, 1955, now Patent No. 2,911,600, which application is assigned to the same assignee as the present application. The circuit of said Patent No. 2,911,600 achieves independent control of midfrequency and band width, but the circuit of Patent No. 2,911,600 requires two voltage sources. One of these may be a voltage source which is also employed for other purposes, as, for example, to supply filament voltage for amplifier tubes. However in the circuit of Patent No. 2,911,600 the second source must be independent of the first source, thus requiring a duplication of batteries which entails added weight and complications that are particularly undesirable in portable seismograph equipment. It is the object of this invention to eliminate the necessity for the additional source of voltage and to provide a control network for a saturable-reactor type of seismograph filter circuit which employs but a single voltage source and which may be an already available voltage source.

The invention is described with reference to the accompanying drawings which form a part of the specification and in which:

Figure 1 illustrates a filter circuit of the type to which the invention may be applied;

Figure 2 is a schematic wiring diagram of one embodiment of the control circuit of this invention;

Figure 3 is a schematic wiring diagram of another embodiment of this invention;

Figure 4 is a schematic wiring diagram of a preferred embodiment of this invention; and Figure 5 is a graph which is helpful in understanding the explanation of the mode of operation of this invention.

Figure 1 shows a band-pass filter circuit of the type shown in U.S. Patent 2,867,779. The midfrequency and band width of such a band-pass filter may be independently controlled by the circuit of this invention. Figure 1 shows a network of resistors 7, 9, 10, 8 and capacitors 3, 5, and inductances 4, 6, all connected in the manner shown in Figure 1 so as to provide a band-pass frequency transmission characteristic from the input terminals 1 to the output terminals 2 in well-known manner. The inductances 4 and 6 are conventional saturable-core reactors having control windings 4($a$) and 6($a$) respectively which are connected to terminals $x$—$x$ and $y$—$y$ respectively and to which D.C. control current is supplied. The inductance of the respective reactors 4 and 6 may be controlled by varying the direct current flowing in the respective windings 4($a$) and 6($a$). The control current in the two windings 4($a$) and 6($a$) may be the same or different, depending on the desired adjustment of the reactors 4 and 6. It is apparent that as the current in winding 4($a$) is increased the inductance of reactor 4 will decrease and as the current in winding 6($a$) is increased the inductance of reactor 6 will decrease. The band width of the filter circuit of Figure 1 will be a minimum when both reactors 4 and 6 are tuned to the same frequency with their respective capacitances 3 and 5. Once the two resonant circuits are tuned, the midfrequency is varied by changing the current in coils 4($a$) and 6($a$) by the same amount. On the other hand if the current in the one coil, e.g. 4($a$) is increased and the current in the other coil, e.g. 6($a$) is decreased, then the reactors 4 and 6 will become tuned to slightly different frequencies and the pass band will become wider. The relative width of the pass band is often termed the "selectivity factor" of the circuit. For purposes of this invention the terms selectivity factor and midfrequency are defined as follows:

$$\text{Midfrequency} = \frac{f_1+f_2}{2}$$

$$\text{Selectivity factor} = \frac{\text{midfrequency}}{\text{band width}} = \frac{(f_1+f_2)}{2(f_2-f_1)}$$

In the above expressions, $f_1$ is the frequency of half amplitude at the low-frequency cut-off of the pass band, and $f_2$ is the frequency of half amplitude at the high-frequency cut-off of the pass band.

The control windings 4($a$) and 6($a$) are connected in the network shown in Figure 2. A direct-current voltage source 12 is connected to and supplies current through a potentiometer 13 whose slider 11 is connected to a junction 15 which forms one terminal of a network comprising adjustable resistors 16 and 17, and fixed resistors 18 and 19. Resistors 18 and 19 have equal resistance, but not necessarily the same resistance as resistors 16 and 17. One terminal of control coil for example 4($a$) is connected to the junction of resistors 16 and 18, and one terminal of the other control coil 6(*a*) is connected to the junction of resistors 17 and 19. The other terminals of the respective control coils 4(*a*) and 6(*a*) are connected together at junction 20 which forms the other terminal of the network. Junction 20 is connected to one end of potentiometer 13 as shown. In the operation of a multi-channel seismograph the elements indicated as 4(*a*) and 6(*a*) in Figure 2 (as well as in Figures 3 and 4) may each comprise a similar combination of series and/or parallel connected control coils 4(*a*) and 6(*a*) respectively located in the filters of the various channels. The coils (or coil combinations) 4(*a*) and 6(*a*) have equal resistance and the resistors 16 and 17 also have equal resistance, but the latter is not necessarily the same as that of the coils 4(*a*) and 6(*a*).

It is apparent that with only so much of the circuit of Figure 2 as had been described, a current will flow between junction points 20 and 15. It is apparent that the resistance of the two branches 4(*a*)–16 and 6(*a*)–17 will be equal, so that the currents flowing in the coils 4(*a*) and 6(*a*) respectively will also be equal. The filter capacitances 3 and 5 are fixed at values so that with equal currents in the control coils 4(*a*) and 6(*a*) the inductances 4 and 6 are tuned to the same frequency and this results in minimum band width of the filter circuit of Figure 1. It is apparent that by varying the position of potentiometer slider 11, the current in the respective coils 4(*a*) and 6(*a*) will vary in the same way and the effect will be to simply vary the midfrequency of the pass band.

It has been found experimentally that commercial saturable-core reactors of the type generally used in seismograph filters are characterized by having a linear relationship between control current and frequency when the reactor is in circuit with a fixed capacity and the frequency is in the the very low audio range i.e. in the range of about 20 to 100 cycles. Accordingly, by employing as potentiometer 13 a series of resistors arranged with appropriate taps (not shown in Figure 2), the midfrequency of the filter may be quickly set to any predetermined calibrated value as desired.

The linear variation of tuning frequency and control current is illustrated by the curve 50 in Figure 5. It is apparent that with zero control current, i.e. with potentiometer slider 11 set at zero (lower end of 13 in Figure 2), the inductances 4 and 6 have maximum values and being tuned to the same frequency with their respective capacitances 3 and 5 produce a pass band of minimum band width whose midfrequency is indicated by point 51 of curve 50. As the control current is increased the inductances both decrease in the same amount, thus maintaining the equality of tuning, and the midfrequency increases as indicated by the upward slope of curve 50.

Let it be assumed that by passing a control current through the coils 4(*a*) and 6(*a*) in a negative sense the inductances 4 and 6 would further increase. The curve 50 would then continue downward to the left of the zero control current axis to cross the axis of zero frequency at point 52. This is of course an unreal condition and is indicated by drawing the curve 50 dotted to the left of the zero control current axis. Such a negative control current can be supplied to the coils 4(*a*) and 6(*a*) in Figure 2 by means of battery 21 and potentiometer 22 connected to the junction of resistors 18 and 19. The negative current is adjusted by adjusting the position of slider 23. In the circuit of Figure 2, the negative side of battery 21 is connected to the positive side of battery 12. Since resistors 18 and 19 are equal, and the resistance of coils 4(*a*) and 6(*a*) are also equal, the reverse current $I_2$ supplied from slider 23 will divide equally between the coils 4(*a*) and 6(*a*). If $I_1$ is the current flowing from junction 15 to slider 11, and $I_2$ is the current flowing from slider 23 to junction 24, and $I_3$ is the current flowing from junction 20 to the junction 25, then $I_3=I_1-I_2$. It is apparent that $I_3$ is the net control current flowing in the coils 4(*a*) plus the net control current flowing in the coils 6(*a*) and is proportional to the abscissa of the curve 50. The component $I_2$ of the total control current is referred to as "reverse" current.

In the above discussion the resistors 16 and 17 have been maintained equal. Now let the resistors 16 and 17 be varied, but in such a way that the sum of their currents (and also the sum of the currents in coils 4(*a*) and 6(*a*)) remains the same as before. This provision is indicated in Figure 2 by the mechanical connection 26. Note that the connection 26 implies more than merely increasing one resistor as the other is decreased, the criterion being that their total current $I_1$ remain unchanged as resistors 16 and 17 are varied. An exact way of accomplishing this will be described later. When resistors 16 and 17 are varied, the currents in control coils 4(*a*) and 6(*a*) no longer remain the same, and the inductances 4 and 6 change so that they are no longer tuned to the same frequency. One reactor will be tuned slightly higher and one slightly lower than the midfrequency corresponding to the abscissa representing the average current. This results in widening of the pass band, although the midfrequency of the pass band remains the same.

By way of explanation let it first be assumed that no reverse current is present. As previously indicated the inductances 4 and 6 of Figure 1 are tuned with condensers 3 and 5 so that with equal currents in control coils 4(*a*) and 6(*a*) the circuit of Figure 1 has minimum band width, i.e. the circuit will tune sharply at the midfrequency. The linear relationship between control current and frequency is represented by curve 50 of Figure 5. Each control coil 4(*a*), 6(*a*) has a current represented for example by abscissa 59 (Figure 5) and the midfrequency of the resulting sharply tuned pass band is represented by ordinate 60. Now let the currents in control coils 4(*a*) and 6(*a*) be changed by adjustment 26 so that the current in coil 4(*a*) increases by an amount $\Delta I$ to a value represented by abscissa 62 and the current in coil 6(*a*) decreases the same amount to a value represented by abscissa 61, the total current remaining the same. As a consequent of the linear relationship between tuning and frequency the upper and lower cut-off frequencies $f_2$ and $f_1$ are given by ordinates 63 and 64. It is apparent that because curve 50 is a straight line, the upper cut-off frequency 63 (i.e. $f_2$) is as much above the former midfrequency as the lower cut-off 64 (i.e. $f_1$) is below the former midfrequency, i.e., the midfrequency as herein defined has not been changed by changing the band width through changing the adjustment 26 in the manner specified.

Still in the absence of reverse current, consider changing the midfrequency under conditions of a finite band width adjustment (say, for example, the band width illustrated above) by adjustment of potentiometer slider 11. As the total control current is changed the average control current changes in the same way. For example if the total control current is reduced, then the control currents in coils 4(*a*) and 6(*a*) will be reduced proportionately. This results in the points 61 and 62 approaching zero as the average control current is reduced to zero. The difference $\Delta I$ between the two control currents will also become zero at point 51. As a result of this the points 63 and 64 approach point 51 as the average control current is reduced to zero. In the graph of Figure 5 this means that the loci of construction intersections 65 and 66 respectively pass through point 51 as indicated by dashed lines 53 and 54. Accordingly the selectivity factor $$\frac{(f_1+f_2)}{2(f_2-f_1)}$$

changes, becoming very large at zero control current. Actually the loci 53 and 54 are merely illustrative and are somewhat idealized since the pass band will usually have a small but finite width at zero control current (point 51).

By introducing reverse current it becomes possible to make the loci of points 65 and 66 intersect the curve 50 at some point other than point 51. By proper adjustment of slider 23 this intersection may be placed at any desired location to the left of point 51, e.g., on the axis of zero frequency, i.e., at point 52. With this amount of reverse current present the difference ΔI between the currents in coils 4(*a*) and 6(*a*) (when set for a finite band width) changes in such a manner that ΔI is proportional to the average current as measured from point 52 when the average control current is varied (by adjustment of slider 11) whereby the loci of points 65 and 66 become respectively curves 55 and 56 of Figure 5. The proper amount of reverse current may be determined in a number of ways, for example, by experimentally determining the curve 50 to the right of the zero current axis and graphically extending a plot of the curve to the left to intersect the zero frequency axis and scaling the negative current intercept on the graph, or the proper reverse current can be computed from the experimentally observed frequency intercept 51 and the observed slope of curve 50. In the presence of the specified reverse current, the band width $f_2-f_1$ for a given fixed adjustment 26 is proportional to the midfrequency and the selectivity factor, i.e., midfrequency/band width, remains constant as the midfrequency is changed. Therefore in the circuit of this invention using the reverse current specified, the selectivity factor as previously defined remains constant as the midfrequency is varied by changing the position of potentiometer slider 11, whereas the midfrequency remains constant as the selectivity factor is varied by changing the adjustment 26 of resistors 16 and 17 in such manner as to keep the total current constant.

Attention should be drawn to the fact that in no case is any reactor to be operated with negative net current because the reactor does not distinguish between positive and negative current. Accordingly the respective controls are interlocked so as to exclude all possible adjustments that would result in less than zero current in any reactor. This means that no adjustment is permitted whose frequency would be represented by a point on any of the curves 50, 55 or 56 to the left of the zero current axis. The most convenient way of doing this is by the use of step switches for controlling the midfrequency adjustment 11, and the band-width adjustment 26, with excluded adjustments either prevented by interlocks (not shown) between the step switches or indicated by an appropriate alarm signal (not shown).

It is apparent that the reverse current $I_2$ is not changed, so that adjustment of slider 23 is never changed once properly set. Therefore the battery 21 and potentiometer 23 may be replaced by a single source of the proper voltage connected with its negative terminal to junction 25 and its positive terminal to junction 24.

Figure 3 illustrates an alternative circuit that accomplishes the same result as Figure 2 by means of a single battery 27, with the other elements of the circuit being substantially similar to like-numbered elements of Figure 2.

Figure 4 illustrates a preferred embodiment of the invention. Inasmuch as the function of the reverse current $I_2$ is merely to displace the point 51 to the axis of zero frequency, the amount of the reverse current $I_2$ remains fixed. In Figure 4 the reverse current $I_2$ is obtained from the potential drop across a silicon diode 28 through which current from battery 29 flows in a direction opposite to the normal low resistance direction, the latter condition being indicated by the arrow in the symbol 28, this being known as Zener diode operation. The particular diode 28 employed together with the resistances in the other parts of the network are chosen so as to give the proper reverse current required to make the leftward extensions of curves 50, 55, and 56 intersect at point 52 on the axis of zero frequency. In order that the resistors 16 and 17 always be adjusted so that $I_1$ and $I_3$ do not change during this adjustment, a number of resistors 17(*a*), 17(*b*), 17(*c*), 17(*d*), and 16(*a*), 16(*b*), etc., are employed with a step switch 30 bridging the proper values as shown in Figure 4, the proper values of the resistors being readily computed. Also in order to provide discrete steps in the midfrequency adjustment and avoid excluded values, the potentiometer slider 11 is replaced by a tap switch on potentiometer 13 as shown. Due to the fact that a small amount of the reverse current $I_2$ may return to the source through resistors 16 and 17 it is necessary to maintain constant the impedance of the source as seen from points 30 and 32 as the position of switch 31 is changed. In order to attain this, each tap on the potentiometer 13 is provided with a series resistor as illustrated by 33 in Figure 4. The resistors 33 are chosen for the respective taps to maintain this condition, the proper values of the resistors being readily computed. Other well-known means of maintaining constant the source impedance as seen from points 30 and 32 may be employed, as for example by using a regulated power supply of effectively zero impedance. The two switches 30 and 31 are interlocked (not shown) to prevent adjustments which would result in too wide a pass band when the midfrequency control is set too low, since this would require less than zero current in one of the reactor control coils.

It is apparent that curves 55 and 56 are merely by way of example. For the narrowest pass band resistors 16 and 17 have equal values, for a slightly wider pass band resistors 16 and 17 differ only slightly and the curves 55 and 56 lie close to curve 50, and for a wider pass band the resistors 16 and 17 differ to a larger degree, and curves 55 and 56 lie farther from curve 50.

It is evident that the embodiments of Figures 3 and 4 require but a single D.-C. supply and attain independent control of midfrequency and selectivity factor. An additional advantage accrues to this invention when a condenser discharge circuit is employed to obtain a time-varying control of filter characteristic. In the control of Serial No. 546,708 it is necessary to use two separate condenser discharge circuits whereas the circuit of this invention requires but a single condenser discharge circuit. Furthermore, the present invention has the advantage that the midfrequency may be adjusted while keeping the selectivity factor constant. The selectivity factor has been found to be a more fundamental criterion of filter circuit behavior than the band width $(f_2-f_1)$ and it is therefore more advantageous to maintain the selectivity constant as the midfrequency is varied.

Whereas a particular embodiment of the circuit of this invention has been described as a means for maintaining constant the selectivity factor as the midfrequency is changed in a band-pass filter having saturable core reactors, it is apparent that by appropriate adjustment of the magnitude and direction of the control current component $I_2$ it is possible to place the intersection of curves 50, 55, and 56 at any desired location on the curve 50 or on an extension thereof, whereby any other predetermined linear variation of band width (or selectivity factor) with midfrequency adjustment may be obtained as desired.

What I claim as my invention is:

1. Apparatus for adjusting the frequency characteristics of an electrical filter having a saturable-core reactor with a control coil whose current controls the low-frequency cut-off of the filter characteristic and a saturable-core reactor with a control coil whose current controls the high-frequency cut-off of the filter characteristic and equal current in said control coils having substantially the same effect on the respective cut-off frequency and said control coils having substantially the same electrical resistance, which comprises a series loop network having said control coils connected to each other and to two variable resistors, a series branch of two resistors of equal resistance connected in parallel with said control coils, a first source of voltage connected from the junction of said variable resistors to the junction of said control coils, and a second source of voltage connected from the junction of said equal resistors to the junction of said control coils, the terminal of said second source that is connected to the junction of said control coils being opposite to the polarity of the terminal of said first source that is connected to the junction of said control coils.

2. Apparatus for adjusting the frequency characteristics of an electrical filter having a saturable-core reactor with a control coil whose current controls the low-frequency cut-off of the filter characteristic and a saturable-core reactor with a control coil whose current controls the high-frequency cut-off of the filter characteristic and equal current in said control coils having substantially the same effect on the respective cut-off frequency and said control coils having substantially the same electrical resistance, which comprises a series loop network having said control coils connected to each other and to two variable resistors, a series branch of two resistors of equal resistance connected in parallel with said control coils, a first source of adjustable voltage connected from the junction of said variable resistors to the junction of said control coils, and a second source of fixed voltage connected from the junction of said equal resistors to the junction of said control coils, the terminal of said second source that is connected to the junction of said control coils being opposite to the polarity of the terminal of said first source that is connected to the junction of said control coils.

3. Apparatus for adjusting the frequency characteristics of an electrical filter having a saturable-core reactor with a control coil whose current controls the low-frequency cut-off of the filter characteristic and a saturable-core reactor with a control coil whose current controls the high-frequency cut-off of the filter characteristic and equal current in said control coils having substantially the same effect on the respective cut-off frequency and said control coils having substantially the same electrical resistance, which comprises a series loop network having said control coils connected to each other and to two variable resistors, a series branch of two resistors of equal resistance connected in parallel with said control coils, a first source of voltage connected from the junction of said variable resistors to the junction of said control coils, and a second source of voltage connected from the junction of said equal resistors to the junction of said control coils, said first and second voltage sources comprising series resistors supplied by a common source of electrical energy.

4. Apparatus for adjusting the frequency characteristics of an electrical filter having a saturable-core reactor with a control coil whose current controls the low-frequency cut-off of the filter characteristic and a saturable-core reactor with a control coil whose current controls the high-frequency cut-off of the filter characteristic and equal current in said control coils having substantially the same effect on the respective cut-off frequency and said control coils having substantially the same electrical resistance, which comprises a series loop network having said control coils connected to each other and to two variable resistors, a series branch of two resistors of equal resistance connected in parallel with said control coils, a first source of adjustable voltage connected from the junction of said variable resistors to the junction of said control coils, a second source of fixed voltage connected from the junction of said equal resistors to the junction of said control coils, said first source comprising a potentiometer, said second source comprising a Zener diode, and said potentiometer and said diode being connected in series and energized by a source of direct current.

5. Apparatus for adjusting the frequency characteristics of an electrical filter having a saturable-core reactor with a control coil whose current controls the low-frequency cut-off of the filter characteristic and a saturable-core reactor with a control coil whose current controls the high-frequency cut-off of the filter characteristic and equal current in said control coils having substantially the same effect on the respective cut-off frequency and said control coils having substantially the same electrical resistance, which comprises a series loop network having said control coils connected to each other and to two variable resistors, a series branch of two resistors of equal resistance connected in parallel with said control coils, a first source of adjustable voltage connected from the junction of said variable resistors to the junction of said control coils, a second source of fixed voltage connected from the junction of said equal resistors to the junction of said control coils, said first source comprising a potentiometer, said second source comprising a Zener diode, said potentiometer and said diode being connected in series and energized by a source of direct current, and means for inversely varying said variable resistors whereby the sum of the currents through said variable resistors is maintained constant.

References Cited in the file of this patent

UNITED STATES PATENTS

| | | |
|---|---|---|
| 2,867,779 | Bardeen et al. | Jan. 6, 1959 |
| 2,884,632 | Dewitz et al. | Apr. 28, 1959 |
| 2,886,765 | Hetzler | May 12, 1959 |